United States Patent Office 3,519,019
Patented July 7, 1970

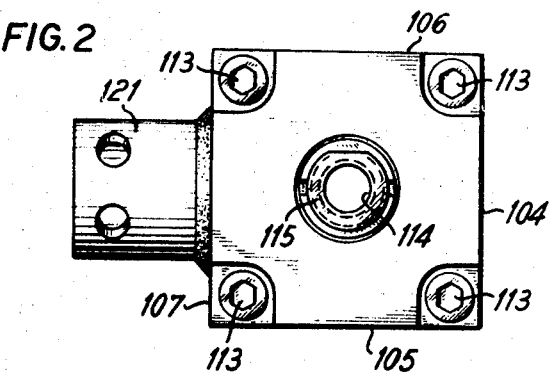
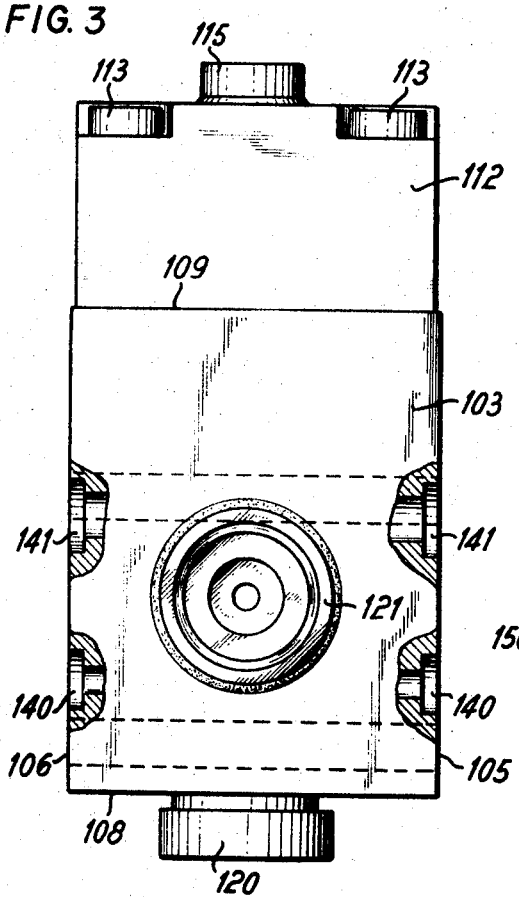
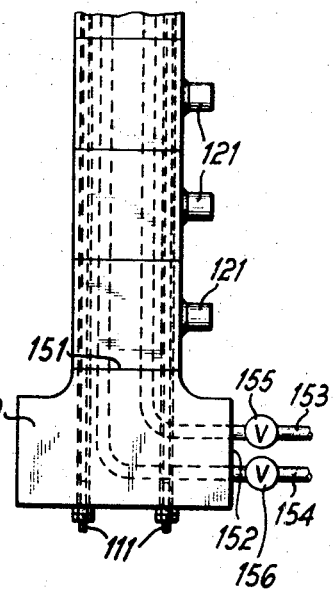

---

3,519,019
PNEUMATICALLY ACTUATED HYDRAULIC CONTROL VALVE
Hans Rieschel, Essen-Holsterhausen, Germany, assignor to Bergwerksverband GmbH, Essen, Germany, a company of Germany
Original application Jan. 29, 1968, Ser. No. 701,401. Divided and this application Feb. 5, 1969, Ser. No. 796,755
Int. Cl. F16k *11/02, 11/20*
U.S. Cl. 137—625.6                                  1 Claim

ABSTRACT OF THE DISCLOSURE

A valve for controlling hydraulic or pneumatic systems in mine casing techniques. A housing containing a diaphragm valve that has at least one flat face through which extend bores for enabling two adjacent housings to be connected by tie bolts providing a substantially rectangular column to which feed and return lines can be attached. Such housing is attached to one end of a valve housing which has its form matched to that of the diaphragm housing and has a diaphragm operating piston. A further housing is attached to the valve housing and accommodates a return spring while the individual components of the valve are arranged in a bore communicating with the diaphragm piston and the spring. The valve elements are in the form of balls which are actuated through a plunger. Two through bores opening at the two flat faces of the housing serve as feed and return ports for fluid. A manually operated button controls the diaphragm operating system.

CROSS REFERENCE TO RELATED APPLICATION

This application constitutes a division of the application of Hans Rieschel Ser. No. 701,401, filed Jan. 29, 1968, and entitled Control Arrangement for Hydraulic Pit Prop Support Units.

BACKGROUND OF THE INVENTION

Valves, which acn be employed quite generally in control systems, but which are particularly suitable for the control and regulation of hydraulic casing operations underground and which enable pneumatic control of the hydraulic system to be effected, have the advantage of providing the kind of precision in control which sensitive regulation requires, a precision which is frequently not obtainable with signals of mechanical nature, and also the advantage of doing away with electrical systems which are often difficult to render safe for control operations in locations where there is a risk of explosion.

Valves with diaphragm control of this kind are well known. Hitherto, however, they have been relatively large units, that is to say they have been designed with considerable nominal cross-sections. In their known form, they frequently operate using an arrangement consisting of a diaphragm piston and a return spring. However, they cannot be sufficiently reduced in size to be employed in hydraulic casing operations in mines. Also, even if they could be reduced in size to this extent, they could then not be given sufficient mechanical resistance.

On the other hand, solenoid-operated valves are known which, using valve elements, in particular ball-type valve elements, operated by a plunger slidably mounted in a valve housing, alternately open and close an output load, i.e. connect this output either with the return line or with the high pressure line. Apart from the disadvantages associated with the electrical control of the solenoid system, which disadvantages have been set out hereinbefore, the problem also arises in this case of achieving suitable step-up or step-down between the diaphragm operating system and the valve elements. This generally means the introduction of levers which not only give rise to large dimensions in the overall arrangement, but also have the drawback from the control point of view that the sensitivity of operation is affected by the unavoidable backlash in the linkage. The consequence is undesirable characteristics and transient functions.

SUMMARY OF THE INVENTION

In accordance with the invention, the valve is so designed that while avoiding the aforementioned drawbacks and difficulties, it permits constructional arrangement of a substantially arbitrary nature and also variability of characteristics, and can itself be miniaturised, in particular in such a way that the hydraulic connections can be developed in an integrated circuit fashion, hydraulic circuit arrangements of this kind being very easy to house because of their small dimensions.

In this context, a further feature of the invention provides a housing suitable for the parallel arrangement of several diaphragm operating systems, in particular a housing which is flat on at least one side and in particular on at least two opposite sides, such housing serving at least to accommodate the valve associated with each diaphragm operating system, and connecting elements, in particular in the form of fixing or tie bolts, passing perpendicularly through bores which open into the said surface or surfaces, said bolts serving to hold together several such housings.

The valves and possibly the diaphragm operating housings, formed in this fashion, can be assembled together in a block or column. This can be achieved by attaching the valves to a common distributor plate but also by directly assembling together the housings with the aid of the tie bolts extending through them. The result is a substantially rectangular column to which the requisite feed and return lines can be attached without any particular problem.

Square or rectangular housings of this kind can be substantially reduced in size compared with known shut-off valves using a diaphragm operating system consisting of diaphragm piston and return spring, if their construction is so contrived that a housing accommodating the diaphragm piston, in particular a housing of square plan form, is attached to one end of the valve housing, the latter in particular having its plan form matched to that of the housing for the diaphragm piston, to the other end of which valve housing a further housing accommodating the return spring is attached, whilst the individual components of the valve are arranged in a communicating bore extending between the diaphragm piston and the spring. This also furnishes the essential advantage that the overall valve assembly can be withdrawn en bloc and replaced by another, in particular a valve assembly having a different characteristic, as required.

By this measure, the result is achieved in fact that the actual valve is enclosed between the diaphragm operating system and the return spring, so that the diaphragm piston can act directly on the valve element, which is actuated through a plunger and takes the form of a ball, at the other end of which valve element the spring acts, thus making it possible to discard the connecting elements hitherto employed between diaphragm piston and spring.

A further contribution to the miniaturisation of the overall arrangement is made by so designing the valve that the connection for the load device extends away at right-angles from the uniform direction of axial movement of the said valve elements (in particular ball-type elements), the said diaphragm piston and the said return spring. If, furthermore, the arrangement is so contrived, in accordance with a further feature of the invention, that two through bores, which open out at the two flat faces of the housing, are provided to do duty as the feed and return ports for the hydraulic or pneumatic source, then a very simple parallel arrangement of the load connections to these feed and return lines, which extend through a column of said valves, is achieved.

The result is that the overall valve arrangement is so small, even where a plurality of loads is involved, that it can be used to carry out all the requisite control and regulating functions with the requisite high speed, in particular in the context of hydraulic mine casing systems.

Further features and advantages of the invention will emerge from the following description given by way of example only with reference to the accompanying drawings.

BRIEF DESCRIPTION OF DRAWINGS

In the drawings:

FIG. 2 is a plan view of the valve of FIG. 1;

FIG. 3 is a side elevation of the valve of FIG. 1; and

FIG. 4 illustrates the manner in which several valves may be installed.

Figure 1:
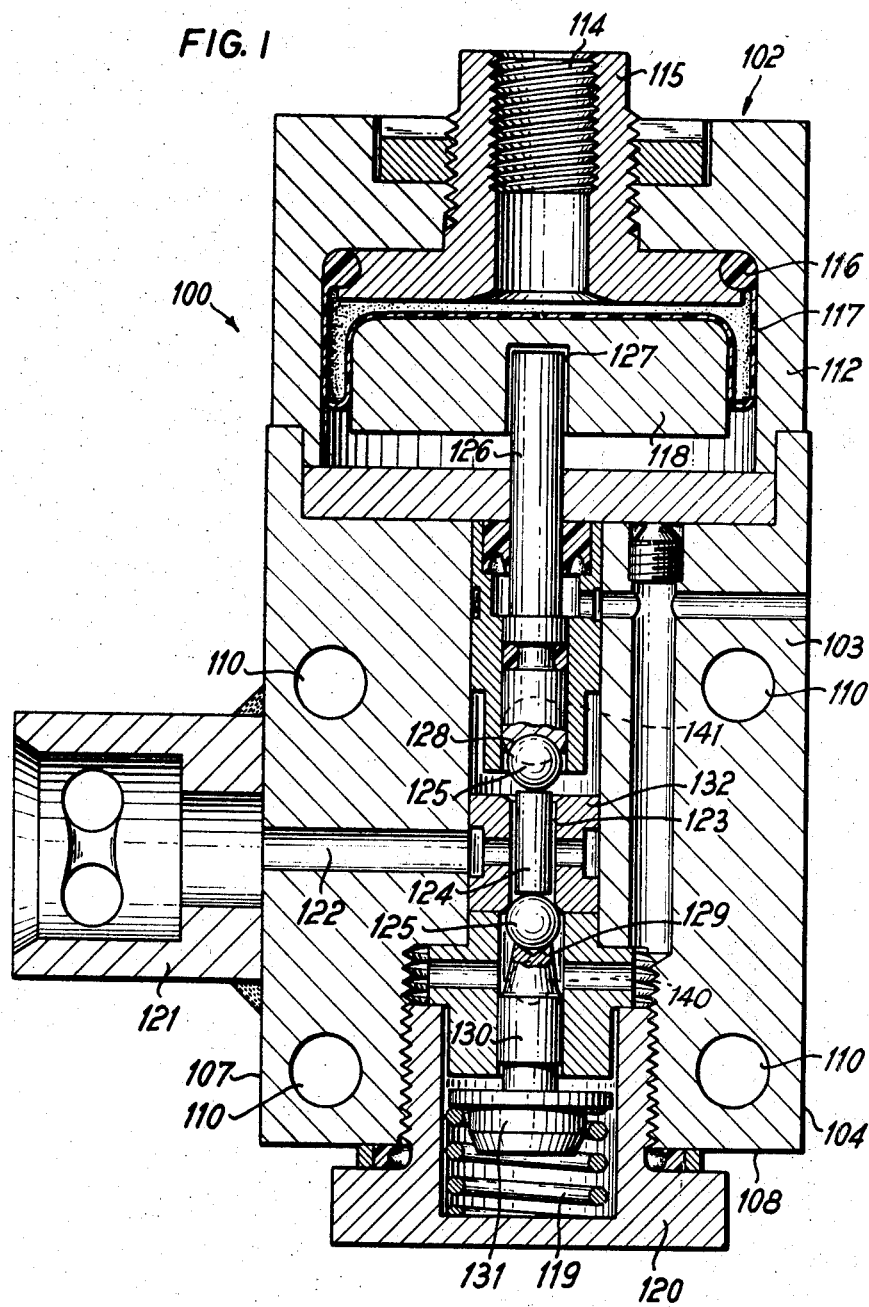
FIG. 1 is a sectional view of a valve for use in the arrangement according to the invention.

A preferred practical switching valve is illustrated in FIGS. 1 to 4, and consists of two main sections, namely a valve 100 with a diaphragm operating system 102 which is described below in detail. The valve is accommodated in a housing 103 of square plan form in the present embodiment, which thus has four vertical sides 104, 105, 106 and 107. The valve housing 103 has a generally right rectangular form and therefore possesses, in addition to the sides already mentioned, sides 108 and 109 at right-angles thereto (see FIG. 3).

This kind of design gives rise to two mutually opposite flat faces 106 and 105. Perpendicularly to these faces 106 and 105 extend four bores of the same diameter throughout, which accommodate tie bolts 111 (FIG. 4), so that a block assembly, made up of several of the devices shown in FIGS. 1 to 3, can be created. The diaphragm operating system is accommodated in a housing 112 the elevational and plan form of which correspond to the elevation and plan forms of the housing 103 already described in relation to the valve. The housing 112 is attached to the housing 103 by means of four screws 113 (see FIG. 2).

At its top side, at the point 114 (see FIG. 1), the connection for the compressed air is to be seen. By means of a bushing 115, beading 116 on a flexible diaphragm 117 acting upon a piston 118 is trapped between the inside wall of the housing and the bushing. The diaphragm operating system also incorporates a return spring 119 in a spring cap 120, the cap 120 being screwed into the end 108 of the valve housing 103, as the illustration shows. The housing 103 also has an outlet or load connection 121 (see FIGS. 1 and 3).

From the connection 121 a bore 122 extends into the housing 103, terminating in an axial bore 123. In the axial bore 123 there slides a plunger 124, against the ends of which, in this particular example, bear ball-type valve elements 125. A plunger 126 is carried at one end at point 127 in the diaphragm piston 118, and at the other end at point 128 seats on one of the valve elements 125. The other valve element 125 seats on one end 129 of an additional plunger 130 with an enlarged head portion 131 against which bears the spring 119 of the diaphragm operating system. At the exit points of the bore 123 in the element 132 are formed seats for the two valve elements 125.

As FIGS. 1 and 3 show, the overall system has a connection 140 on each of the said flat faces 106 and 105 on the housing 103, these connections being for a pump, and similar connections 141 on each face for the return line to a reservoir.

For the rest, the system of bores inside the housing 103 is so contrived that, all in accordance with which of two possible positions the two valve elements 125 adopt, the load connection 121 is in communication with the reservoir (return line) or with the pump (supply line). Such systems of bores are well known and the particular arrangement illustrated requires no further explanation here.

If, in the device illustrated, the space above the diaphragm 117 is filled with compressed air, then the piston 118 shifts the plunger 126 and thus moves the upper of the two valve elements 125 shown in FIG. 1 onto its seat. When the pressure in the space above the diaphragm 117 collapses, the spring 131 returns the lower of the two valve elements shown in FIG. 2 to its seat, and lifts the other valve element away from its seat.

As FIG. 4 indicates, several of the complete switching devices explained hereinbefore and illustrated in detail in FIGS. 1 and 3, can be assembled together to form a block or column. All that this requires is a T-shaped junction piece 150, with a connection face 151, to which junction piece a virtually unlimited number of the said devices can be connected through the medium of the tie bolts 111 already described. The load connections 121 then exit at one side, although the arrangement could easily be contrived in such a fashion that some of the connections 121 exit at one side and others at the other side.

The main lines 153 and 154 terminate at the face 152, in cocks 155 and 156. These lines lead to the reservoir or to the pump.

As can be seen, in this way a switching block can be achieved which is extremely compact, and which is distinguished by direct control channels and very sensitive control characteristics.

What I claim is:

1. Control valve mechanism comprising:
    a housing having a chamber adjacent one end,
    a piston reciprocable in said chamber,
    a flexible diaphragm bearing against the outer end portion of said piston,
    means securing the free edge of said diaphragm to the housing thereby to provide an expansible chamber,
    means providing a duct leading from the outside to said expansible chamber adapted to conduct air under pressure for driving said piston inwardly,
    an axially arranged socket on the inner face of said piston,
    a plunger having one end extending into said socket,
    a first ball valve engaged by the opposite ends of said plunger,
    a seat in the housing for said first ball valve,
    a first passage adapted to extend from said housing to a reservoir and arranged to be closed when said first ball valve is moved to its seat by inward movement of said piston,
    a second ball valve spaced from said first ball valve,
    a seat for said second ball valve so arranged as to be unseated when said first ball valve is seated and vice versa,
    a second plunger disposed between said ball valves for transferring movement from one to the other,
    the ball valves being spaced by the second plunger farther apart than the seats,
    a bore between the seats larger than the second plunger,
    a second passage adapted to extend from said housing to a source of liquid under pressure and arranged to be closed when said second ball valve is moved to its seat,
    a third plunger bearing against said second ball valve,
    a spring biasing said third plunger for urging said second ball valve to its seat, and
    a third passage in said housing between said first and second passages and leading from the outside to the bore between said ball valves adapted selectively to communicate with a source of liquid under pressure or with a reservoir, said housing having flat faces to which lead said first and second passages.

References Cited

UNITED STATES PATENTS

| | | | | |
|---|---|---|---|---|
| 2,834,368 | 5/1958 | Gray | | 137—271 |
| 3,004,549 | 10/1961 | Temple | | 251—14 XR |
| 3,047,017 | 7/1962 | Brinkel | | 137—625.6 |
| 3,326,239 | 6/1967 | Saint-Joanis et al. | | 137—625.66 |
| 3,081,793 | 3/1963 | Flatt et al. | | 137—625.66 |

HENRY T. KLINKSIEK, Primary Examiner